United States Patent
Kim

(10) Patent No.: US 9,602,756 B2
(45) Date of Patent: Mar. 21, 2017

(54) DISPLAY APPARATUS AND CONTROL METHOD THEREOF

(71) Applicant: SAMSUNG ELECTRONICS CO., LTD., Suwon-si (KR)

(72) Inventor: In-beom Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 666 days.

(21) Appl. No.: 13/714,707

(22) Filed: Dec. 14, 2012

(65) Prior Publication Data

US 2013/0162907 A1 Jun. 27, 2013

(30) Foreign Application Priority Data

Dec. 26, 2011 (KR) .......................... 10-2011-0142169
Dec. 26, 2011 (KR) .......................... 10-2011-0142189
Jan. 31, 2012 (KR) .......................... 10-2012-0009708
Aug. 10, 2012 (KR) .......................... 10-2012-0087649

(51) Int. Cl.
| H04N 5/44 | (2011.01) |
| H04N 21/418 | (2011.01) |
| G06F 1/16 | (2006.01) |
| H04N 5/64 | (2006.01) |

(52) U.S. Cl.
CPC ........... *H04N 5/44* (2013.01); *H04N 21/4183* (2013.01); *G06F 1/1601* (2013.01); *H04N 5/64* (2013.01)

(58) Field of Classification Search
CPC ........... G06F 1/1601; H04N 5/64; H04N 5/44
See application file for complete search history.

(56) References Cited

U.S. PATENT DOCUMENTS

| 5,263,158 A | 11/1993 | Janis |
| 6,035,358 A | 3/2000 | Tanikawa |
| 6,161,156 A | 12/2000 | Suzuki et al. |
| 7,565,649 B2 * | 7/2009 | Sasabe ...................... G06F 8/65 717/168 |
| 2007/0002181 A1 | 1/2007 | Kim |

(Continued)

FOREIGN PATENT DOCUMENTS

| CN | 1892804 A | 1/2007 |
| CN | 1996451 A | 7/2007 |
| KR | 10-2008-0000329 A | 1/2008 |

OTHER PUBLICATIONS

Communication, dated Mar. 7, 2014, issued by the European Patent Office in counterpart European Application No. 12198784.6.

(Continued)

*Primary Examiner* — William C Vaughn, Jr.
*Assistant Examiner* — Jerry Jean Baptiste
(74) *Attorney, Agent, or Firm* — Sughrue Mion, PLLC

(57) ABSTRACT

Disclosed are a display apparatus including a display unit which displays an image thereon; a first image processor which processes an image signal based on a predetermined image processing operation, and displays an image based on the processed image signal; a first central processor which controls the display unit and the first image processor; and a first controller which grants a control right to the first central processor or to an upgrading apparatus, which upgrades the display apparatus, to control the display apparatus when the upgrading apparatus is connected to the display apparatus.

25 Claims, 13 Drawing Sheets

(56) References Cited

U.S. PATENT DOCUMENTS

| | | | |
|---|---|---|---|
| 2007/0113067 A1* | 5/2007 | Oh | G06F 8/65 |
| | | | 713/2 |
| 2007/0118683 A1* | 5/2007 | Yang | G06F 8/65 |
| | | | 711/103 |
| 2007/0162623 A1 | 7/2007 | Kondo | |
| 2008/0109765 A1* | 5/2008 | Chae | G09G 5/003 |
| | | | 715/866 |
| 2009/0018962 A1 | 1/2009 | Ying et al. | |
| 2011/0167287 A1* | 7/2011 | Walsh | G06F 1/266 |
| | | | 713/323 |

OTHER PUBLICATIONS

Communication dated Jun. 5, 2013 issued by the European Patent Office in counterpart European Application No. 12198784.6.
Communication dated Nov. 1, 2016 issued by the State Intellectual Property of P.R. China in counterpart Chinese Patent Application No. 201210567724.5.

\* cited by examiner

FIG. 7

| Bit state | DISPLAY APPARATUS | UPGRADING APPARATUS |
|---|---|---|
| 00 | disable | disable |
| 01 | enable | disable |
| 10 | disable | enable |
| 11 | enable | enable |

DISPLAY APPARATUS AND CONTROL METHOD THEREOF

CROSS-REFERENCES TO RELATED APPLICATIONS

This application claims priority from each of Korean Patent Application No. 10-2011-0142169, filed on Dec. 26, 2011; Korean Patent Application No. 10-2011-0142189, filed on Dec. 26, 2011; Korean Patent Application No. 10-2012-0009708, filed on Jan. 31, 2012; and Korean Patent Application No. 10-2012-0087649, filed on Aug. 10, 2012 in the Korean Intellectual Property Office, the disclosures of each of which is incorporated herein by reference in its entirety.

BACKGROUND

Field

Apparatuses and methods consistent with the exemplary embodiments relate to a display apparatus and a control method thereof.

Description of the Related Art

A display apparatus processes image signals supplied by an external image source or image data stored therein based on a signal processing operation, and displays an image on a display panel based on the processed image signals/image data. The display apparatus may include a television (TV) or a monitor.

Generally, the display apparatus has an image processing board built therein, including any one or more of various chipsets and memories, to perform image processing operations. In order to remain current with the development of image technology, meet various user demands and improve convenience and efficiency, the display apparatus is required to provide more functions, and such requirements are changing rapidly.

Due to conventional technical limitations, a user often needs to purchase a new display apparatus in order to use hardware and/or software that includes new functions, and this causes a burden to a user. Physical replacement of hardware, i.e., circuit boards of the display apparatus, is not easy from the perspectives of both manufacturing and usage. Execution of new software requires hardware which is designed to be compatible with such software, and thus replacement may be difficult.

Even if the display apparatus is connected to an external apparatus to use functions of the external apparatus, it is often difficult to install elements in the display apparatus to enable the external apparatus by anticipating the form of the external apparatus which has yet to be released on the market. Further, it is not possible to allot an unlimited number of pins for communicating with the external apparatus.

SUMMARY

One or more exemplary embodiments provide a system in which an upgrading apparatus is mounted in a display apparatus to upgrade the display apparatus.

According to an aspect of an exemplary embodiment, there is provided a display apparatus which includes: a display unit which displays an image thereon; a first image processor which processes an image signal based on a predetermined image processing operation, and displays an image based on the processed image signal; a first central processor which controls the display unit and the first image processor; and a first controller which selectively grants a control right to one of the first central processor and an upgrading apparatus, which upgrades the display apparatus, to control the display apparatus when the upgrading apparatus is connected to the display apparatus.

The display apparatus may further include a main body module which includes the display unit and the first controller, and one of the upgrading apparatus and a main board module which includes the first image processor and the first central processor, wherein the upgrading apparatus is usable as a replacement for the main board module.

The first controller may determine whether the main board module is replaced by the upgrading apparatus, and check whether the replaced upgrading apparatus is compatible with the main body module.

The main body module may further include a storage unit which stores setting information relating to the main board module, and the first controller may control the upgrading apparatus to operate based on the setting information stored in the storage unit when the main board module is replaced by the upgrading apparatus.

The display apparatus may further include a power supply which supplies power, and the first controller may control the power supply to cut off a supply of power if the main board module is disconnected from the display apparatus.

The first controller may grant a control right to the first central processor to perform a predetermined control operation corresponding to a first event of a plurality of events, and grant the control right to the upgrading apparatus to perform a control operation corresponding to a second event of the plurality of events.

The first storage unit may store information regarding the control right corresponding to the plurality of events, and when a predetermined one of the plurality of events occurs, the first controller may grant the control right corresponding to the predetermined event to one of the first central processor and the upgrading apparatus, based on the information regarding to the control right stored in the first storage unit.

The upgrading apparatus may store information regarding the control right corresponding to the plurality of events, and when the upgrading apparatus is connected to the display apparatus, the first controller may receive the information regarding the control right which is stored in the upgrading apparatus and use the received information to overwrite the information stored in the first storage unit.

At least one event of the plurality of events may occur when a predetermined signal is received from the outside.

The first controller may check whether the upgrading apparatus includes a microcomputer when the upgrading apparatus is connected to the display apparatus, grant the control right to the microcomputer of the upgrading apparatus to enable the upgrading apparatus if the upgrading apparatus includes the microcomputer, and transmit a system reset signal to enable the upgrading apparatus if the upgrading apparatus does not include the microcomputer.

The first controller may include a connection detecting pin which is connected to a ground terminal and which detects a connection of the upgrading apparatus.

The first controller may check a connection status of the upgrading apparatus by using the connection detecting pin when power is applied, and determine whether to activate the display apparatus solely or to enable the upgrading apparatus, based on a result of the check.

The first controller may include a microcomputer detecting pin which is used to check whether the upgrading apparatus includes the microcomputer.

The microcomputer detecting pin may include a universal asynchronous receiver transmitter (UART) transmission pin which transmits a predetermined call signal to the upgrading apparatus and a UART reception pin which is configured to receive a response signal which corresponds to the predetermined call signal from the microcomputer included in the upgrading apparatus, and the first controller may check whether the UART reception pin receives the response signal and use a result of the check to determine whether the upgrading apparatus includes the microcomputer.

The controller may include a general purpose input output (GPIO) pin, and the controller may transmit, to the upgrading apparatus, a signal for granting the control right and the system reset signal by using the GPIO pin.

According to an aspect of another exemplary embodiment, there is provided a control method which is executable by a display apparatus. The method includes: connecting to an upgrading apparatus; granting a control right to one of a first central processor of the display apparatus and the upgrading apparatus to enable control of the display apparatus; and performing a predetermined control operation by using the one of the first central processor and the upgrading apparatus to which the control right is granted.

The display apparatus may include a main body module which includes a display unit and at least one of the upgrading apparatus and a main board module which includes the first central processor, wherein the upgrading apparatus is usable as a replacement for the main board module.

The granting the control right may include one of granting the control right to the first central processor to perform a predetermined control operation corresponding to a first event of a plurality of events, and granting the control right to the upgrading apparatus to enable the upgrading apparatus to perform a control operation corresponding to a second event of the plurality of events.

The display apparatus may store information regarding the control right corresponding to the plurality of events, and when a predetermined one of the plurality of events occurs, the granting the control right may include granting the control right corresponding to the predetermined event to one of the first central processor and the upgrading apparatus, based on the stored information regarding the control right.

The upgrading apparatus may store information regarding the control right corresponding to the plurality of events, and the method may further include: receiving information regarding the control right stored in the upgrading apparatus when the upgrading apparatus is connected to the display apparatus and using the received information to overwrite the information stored in the display apparatus.

At least one event of the plurality of events may occur when a predetermined signal is received from the outside.

The method may further include determining whether the upgrading apparatus includes a microcomputer when the upgrading apparatus is connected to the display apparatus; granting a control right to the microcomputer to enable the upgrading apparatus if the upgrading apparatus includes the microcomputer; and transmitting a system reset signal to enable the upgrading apparatus if the upgrading apparatus does not include the microcomputer.

The display apparatus may detect a connection of the upgrading apparatus by using a connection detecting pin connected to a ground terminal.

The determining whether the upgrading apparatus includes the microcomputer may include transmitting a predetermined call signal to the upgrading apparatus; and receiving a response signal which corresponds to the predetermined call signal from the microcomputer included in the upgrading apparatus.

The transmitting the predetermined call signal may include transmitting the predetermined call signal by using a universal asynchronous receiver transmitter (UART) pin, and the receiving the response signal may include and receiving the response signal by using the UART pin.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 5, 6, and 7 illustrate an example of granting a control right based on information stored in a memory according to the second exemplary embodiment;

DETAILED DESCRIPTION OF EXEMPLARY EMBODIMENTS

Figure 1:
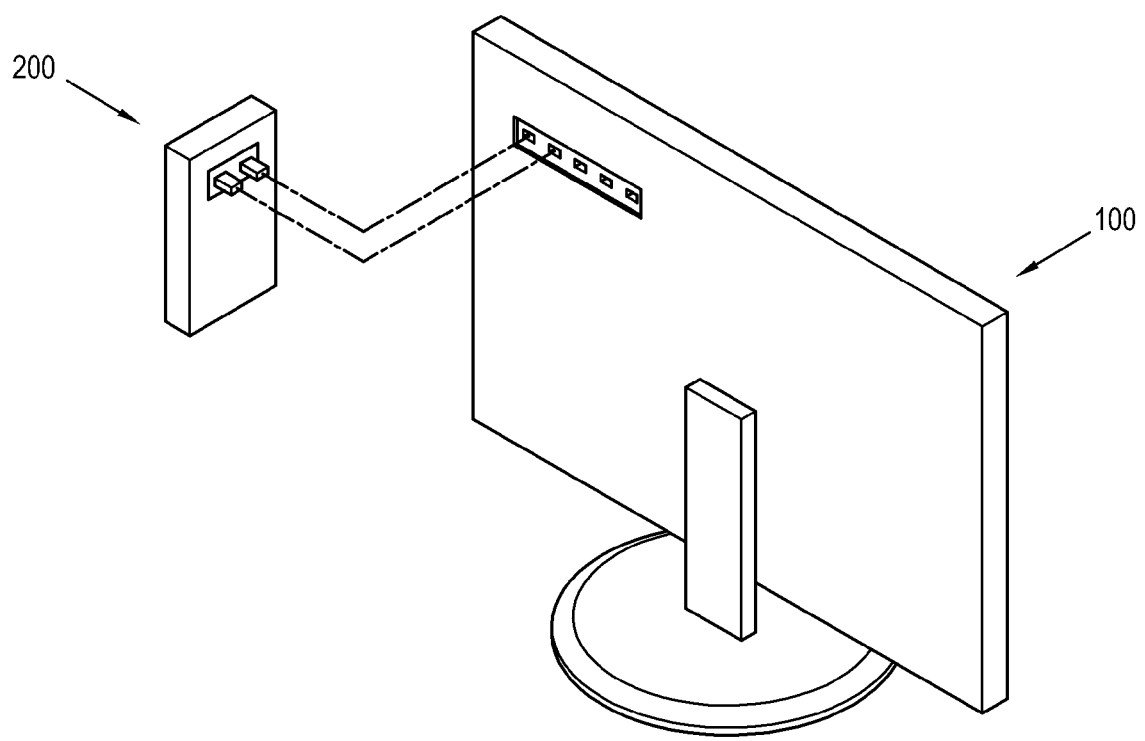
FIGS. 1 and 2 illustrate a display apparatus and an upgrading apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 2:
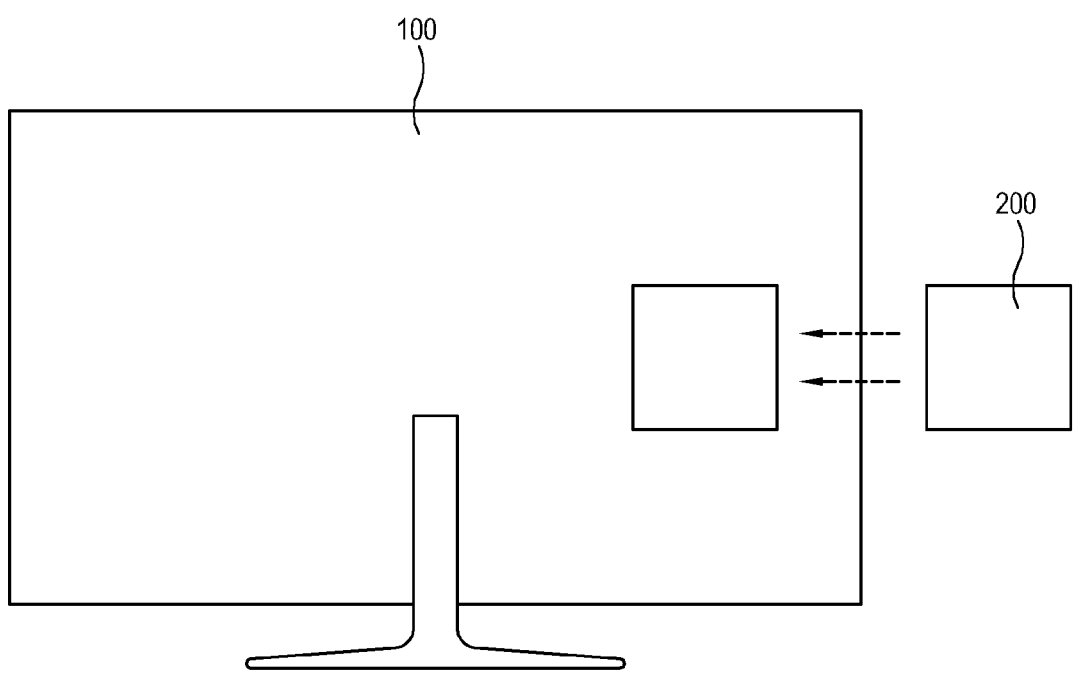

FIGS. 1 and 2 illustrate a display apparatus 100 and an upgrading apparatus 200 according to an exemplary embodiment.

The display apparatus 100 according to the exemplary embodiment processes image signals received from an external image source (not shown) or image data stored therein based on a predetermined image processing operation and displays an image on a display panel based on the processed image signals/image data. The display apparatus 100 may include a TV or a monitor. The display apparatus 100 may include hardware and/or software functions which are upgraded by the upgrading apparatus 200 which is provided to upgrade hardware and/or software functions of the display apparatus 100.

The upgrading apparatus 200 includes image processing blocks, such as a decoder and a scaler, and a microprocessor, such as a microcomputer and a central processing unit (CPU), to control the image processing blocks, and may replace or supplement the same hardware or software of the display apparatus 100. Accordingly, images which have improved quality may be displayed, and various functions which may not have previously been executable by the display apparatus 100 may be executed.

If the upgrading apparatus 200 is connected to the display apparatus 100, the first controller 140 of the display apparatus 100 grants a control right to the display apparatus 100 or the upgrading apparatus 200 to control a predetermined operation, and the predetermined operation is controlled by the one of a microprocessor of the display apparatus 100 or the upgrading apparatus 200 which has been granted the control right. This will be described in detail below.

A method of connecting the upgrading apparatus 200 to the display apparatus 100 may vary. As shown in FIG. 1, the upgrading apparatus 200 may be connected to a connector which is provided in a rear side of the display apparatus 100, or as shown in FIG. 2, a particular module may be separated from the display apparatus 100 and replaced by the upgrading apparatus 200.

Hereinafter, various embodiments of the display apparatus 100 will be described, and repetitive contents of such embodiments will not be explained.

Figure 3:
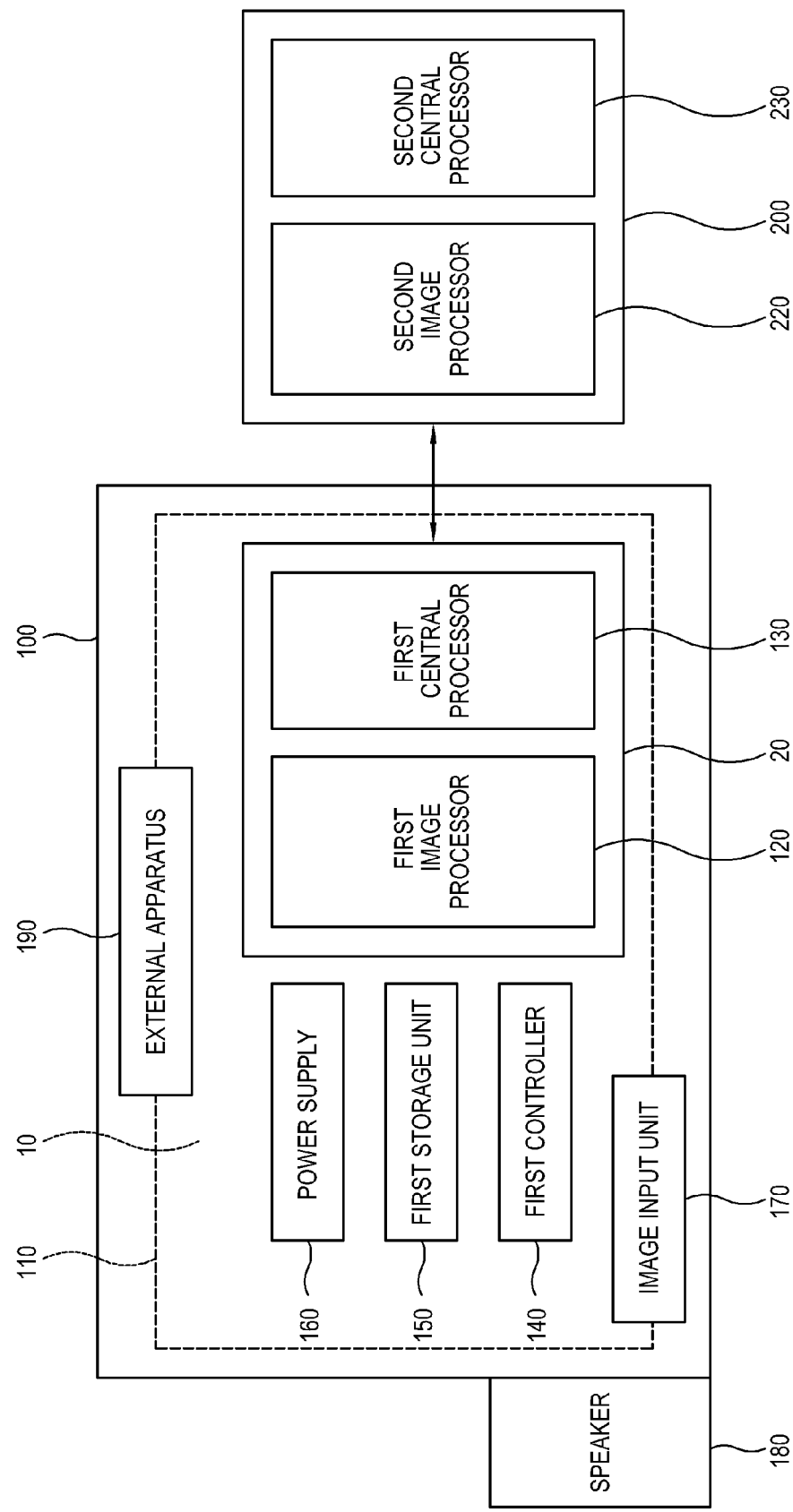
FIG. 3 is a control block diagram of a display apparatus according to a first exemplary embodiment.

FIG. 3 is a control block diagram of the display apparatus 100 according to a first exemplary embodiment.

In the first exemplary embodiment, as described above with reference to FIG. 2, the particular module is separated from the display apparatus 100 and is replaced by the upgrading apparatus 200.

The display apparatus 100 according to the present exemplary embodiment includes a main body module 10 and a main board module 20. The main board module 20 may be removed and replaced by the upgrading apparatus 200. As will be described below, the replacement of a part of the display apparatus 100 is a key concept of the present exemplary embodiment, but the main body module 10 is an essential element of the display apparatus 100 and is not replaceable by other components or modules.

The main board module 20 has various circuits and chipsets built therein which are necessary for controlling operations of the display apparatus 100. The main board module 20 is mounted in the main body module 10 in the rear side of the display apparatus 100 by predetermined locking means, and a user may unlock the existing main board module 20 and mount the upgrading apparatus 200 therein. FIG. 3 illustrates the main board module 20 which may be removed from the rear side of the display apparatus 100, but there will be no hindrance to implement the present exemplary embodiment even if the location of the main board module 20 is changed.

The main board module 20 includes a first image processor 120 and a first central processor 130.

The first image processor 120 processes an image signal by using a predetermined image processing operation in order to display an image on the display unit 110. The image processing operation may include a de-multiplexing operation for dividing a predetermined signal into constituent signals by type, a decoding operation corresponding to an image format of an image signal, a de-interlacing operation for converting an interlaced image signal into a progressive image signal, a scaling operation for adjusting an image signal into a preset resolution, a noise reduction operation for improving an image quality, a detail enhancement operation, a frame refresh rate conversion operation, and/or any other relevant type of image processing function.

The first central processor 130 is implemented as a CPU, and controls overall elements of the display apparatus 100.

The upgrading apparatus 200 may include a second image processor 220 and a second central processor 230 which perform functions respectively corresponding to the first image processor 120 and the first central processor 130 of the main board module 20. A user may remove the existing main board module 20 from the display apparatus 100 and mount the upgrading apparatus 200 in the location where the main board module 20 was installed. In this case, the image processing operations and control operations which had been performed by the removed main board module 20 are performed by the second image processor 220 and the second central processor 230 of the upgrading apparatus 200.

The main body module 10 includes a display unit 110 and a first controller 140.

The display unit 110 displays a processed image thereon. The display unit 110 may be implemented as a plasma display panel (PDP), a liquid crystal display (LCD), an organic light emitting diode (OLED), and/or a flexible display.

The first controller 140 includes a microcomputer and performs a control operation which is independent from a processing operation of the first central processor 130. The first controller 140 determines whether the main board module 20 is separated from the display apparatus 100 and the upgrading apparatus 200 is instead connected to the display apparatus 100, and if so, grants the control right to the upgrading apparatus 200 to perform a control operation by using the second central processor 230 of the upgrading apparatus 200.

If the upgrading apparatus 200 is connected to the display apparatus 100, the first controller 140 may check whether the mounted upgrading apparatus 200 is compatible with the main body module 10. As the upgrading apparatus 200 is provided to upgrade functions of the main board module 20, the upgrading apparatus 200 should perform functions which would otherwise have been performed by the main board module 20. Accordingly, the first controller 140 checks whether the respective functions of the upgrading apparatus 200 match corresponding functions of the main board module 20, and uses a result of the check to determine whether to allow the upgrading apparatus 200 to perform the control operation of the display apparatus 100. The upgrading apparatus 200 may store information regarding the display apparatus 100, such as, for example, resolution of a panel which may be mounded in the display apparatus 100 and application programs which may be utilized by the display apparatus 100. The first controller 140 may check whether the upgrading apparatus 200 is compatible with the main body module 10 by using the information stored in the upgrading apparatus 200. If the upgrading apparatus 200 is not compatible with the main body module 10, a predetermined warning alarm, such a mechanical sound, may be generated for a user.

The display apparatus 100 according to the present exemplary embodiment may further include a first storage unit 150 which stores therein setting information relating to the main board module 20. The setting information includes recorded information regarding the operation of the display apparatus 100 such as, for example, information relating to a viewed channel, volume information, and information relating to a used application. Even if the main board module 20 is removed from the display apparatus 100, the setting information which has been stored at the time when the main board module 20 was used remains in the first storage unit 150, and the first controller 140 may control the upgrading apparatus 200 to operate based on the setting information stored in the first storage unit 140 if the upgrading apparatus 200 is mounted in the display apparatus 100. For example, if the display apparatus 100 is turned on again after the main board module 20 is replaced by the upgrading apparatus 200, the first controller 140 may tune to the channel which was viewed previously, display usage history information relating to an application in the same manner as that employed in the past, and/or maintain previous brightness and mode of a screen. According to the present exemplary embodiment, the first storage unit 150 may include a non-volatile memory such as a flash memory.

The display apparatus 100 may further include a power supply 160 to supply power. If a user desires to replace the main board module 20 with the upgrading apparatus 200 while power is continuously supplied to the main board module 20, a safety issue may arise. Thus, the first controller 140 may control the power supply 160 to automatically cut off power supplied to the display apparatus 100 if the main board module 20 is disconnected from the display apparatus 100.

The display apparatus 100 may further include at least one of an image input unit 170 which includes at least one port to receive an external image signal, and a speaker 180 which outputs sound. According to this exemplary embodiment, the main board module 20 is not the only element which is replaceable, and the image input unit 170 and the speaker 180 are also replaceable for a user to utilize upgraded functions.

The display apparatus 100 may further include an external apparatus mounting unit 190 in which an external apparatus is mounted. For example, the mounted external apparatus may include a camera module, a multimedia over Internet protocol (MoIP) module and/or a communication module. The external apparatus mounting unit 190 is provided as a spare element to utilize new functions by mounting the external apparatus that have not been utilized when the display apparatus 100 was manufactured. In particular, if a function which recognizes a user's motion through a camera module and uses such motion as an input function for performing another function such as change of a channel, the camera module is mounted in the external apparatus mounting unit 190 to utilize such function. As the external apparatus mounting unit 190 is provided as a spare element for functions which are not utilized currently, a general-purpose communication line that is not used currently may be provided. For example, if the display apparatus 100 supports USB 2.0, a communication line between the main board module 20 and the external apparatus mounting unit 190 may be provided as USB 3.0, taking into account that an external apparatus which supports USB 3.0 may be mounted in the future.

According to the first exemplary embodiment above, the main board module 20 may be replaced by the upgrading apparatus 200 to utilize more improved functions which may be performed by the upgrading apparatus 200.

Hereinafter, a display apparatus 100 and a control method thereof according to a second exemplary embodiment will be described with reference to FIGS. 4 to 8.

Figure 4:
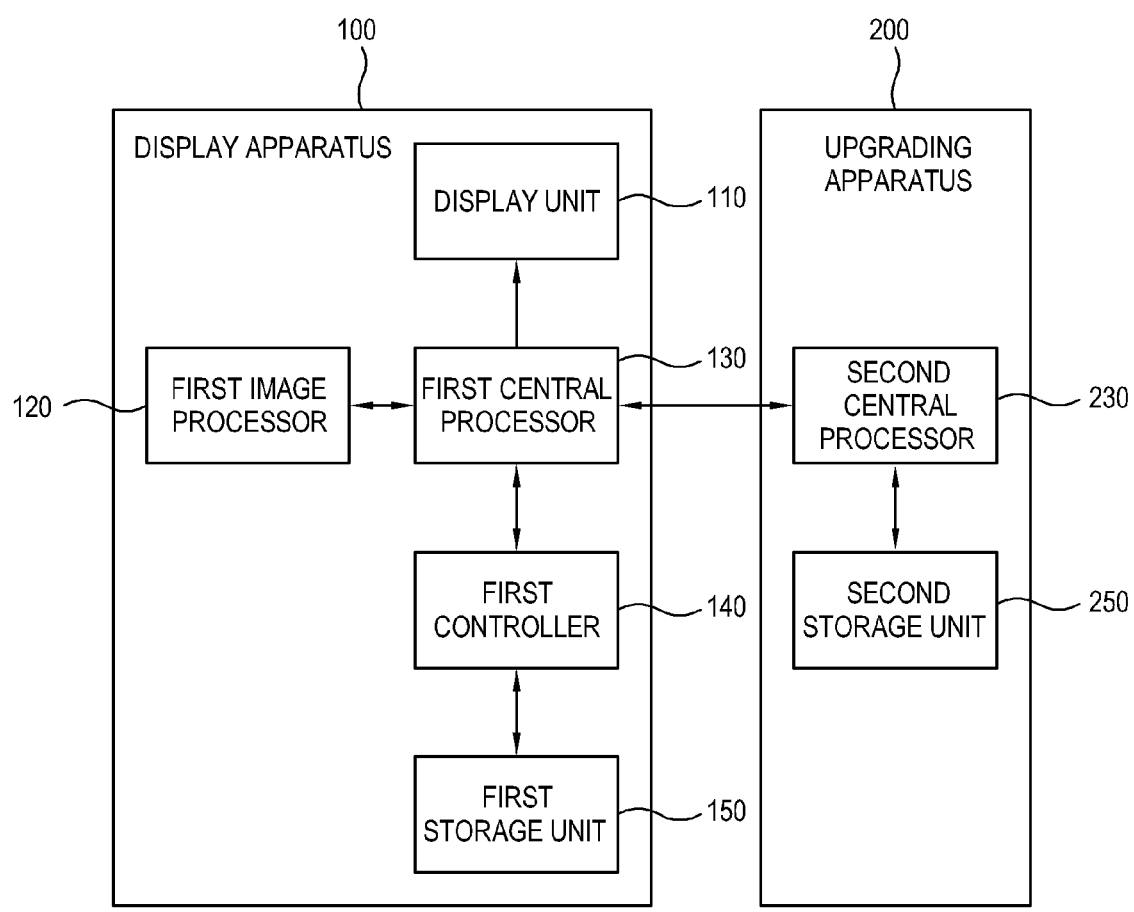
FIG. 4 is a control block diagram of a display apparatus and an upgrading apparatus according to a second exemplary embodiment.

FIG. 4 is a control block diagram of the display apparatus 100 and an upgrading apparatus 200 according to the second exemplary embodiment.

As shown therein, the display apparatus 100 includes a display unit 110, a first image processor 120, a first central processor 130, a first controller 140 and a first storage unit 150.

The display unit 110 displays an image thereon. The display unit 110 may be implemented as a PDP, an LCD, an OLED, and/or a flexible display.

The first image processor 120 processes image signals supplied by an external image supply source (not shown) or image data stored therein according to a predetermined image processing operation in order to display an image on the display unit 110. The image processing operation of the first image processor 120 may include a de-multiplexing operation for dividing a predetermined signal into constituent signals by type, a decoding operation corresponding to an image format of an image signal, a de-interlacing operation for converting an interlaced image signal into a progressive image signal, a scaling operation for adjusting an image signal into a preset resolution, a noise reduction operation for improving an image quality, a detail enhancement operation, a frame refresh rate conversion operation, and/or any other relevant image processing function, but not limited thereto. The first image processor 120 may be implemented as at least one circuit board including various chipsets and memories to perform the image processing operations.

The first central processor 130 is implemented as a typical CPU, and controls overall elements of the display apparatus 100.

The first controller 140 includes a microcomputer and performs a control operation independently from a processing operation of the first central processor 130. The first controller 140 monitors whether a predetermined event occurs, and grants a control right to the first central processor 130 or the connected upgrading apparatus 200 to control operations of elements of the display apparatus 100 corresponding to the predetermined event according to a preset process. The predetermined event may include a reception of a user's input such as an infrared (IR) signal or a key input signal, or an input of an image signal by an external image source connected to a port of the display apparatus 100. For example, if the predetermined event includes a reception of a user's input for changing a channel of a TV based on an IR signal and the first central processor 130 has the control right, the first central processor 130 may control a tuner (not shown) to receive a broadcasting signal of a changed channel.

If the upgrading apparatus 200 is connected to the display apparatus 100, the upgrading apparatus 200 may perform an operation corresponding to the predetermined event. For example, if the upgrading apparatus 200 includes a tuner, a broadcasting signal may be received by the upgrading apparatus 200 based on the change of the channel. If the upgrading apparatus 200 includes a decoder, the image signal may be decoded by the upgrading apparatus 200. In this case, if the element which operates based on the predetermined event is included in both the display apparatus 100 and the upgrading apparatus 200, it is important to set a subject which operates based on the predetermined event.

The first controller 140 grants the control right to the first central processor 130 to perform a predetermined control operation corresponding to a first event of a plurality of events, and grants the control right to the upgrading apparatus 200 to perform a control operation corresponding to a second event of the plurality of events. In particular, upon occurrence of the first event, the display apparatus 100 as the subject operates, and thus, the first central processor 130 controls elements of the display apparatus 100 to operate corresponding to the first event. Upon occurrence of the second event, the upgrading apparatus 200 as the subject operates, and the second central processor 230 included in the upgrading apparatus 200 is granted the control right to control elements of the upgrading apparatus 200.

The display apparatus 100 may include the first storage unit 150 to store therein information regarding the control right corresponding to the plurality of events. According to the present exemplary embodiment, the first storage unit 150 may include a random access memory (RAM) for a faster processing. In this case, the first controller 140 may grant the control right to the first central processor 130 or to the upgrading apparatus 200 based on the event that occurs, and based on the information stored in the first storage unit 150. Granting the control right based on the information stored in the first storage unit 150 will be described below in detail with reference to FIGS. 5 to 7.

As shown in FIG. 4, the upgrading apparatus 200 according to the present exemplary embodiment includes a second central processor 230 and a second storage unit 250, and other elements which perform the same operations as those of the display apparatus 100 or upgraded elements in functionality.

The second central processor 230 may be implemented as a typical CPU which controls operations of the elements of the upgrading apparatus 200. Upon occurrence of a predetermined second event, the second central processor 230 is granted the control right corresponding to the second event by the first controller 140 of the display apparatus 100 and performs a predetermined control operation corresponding to the second event.

The upgrading apparatus 200 may include the second storage unit 250 which stores therein information regarding the control right corresponding to the plurality of events. The second storage unit 250 may be implemented as a non-volatile memory, such as a flash memory, unlike the first storage unit 150 according to the present exemplary embodiment. If the upgrading apparatus 200 is connected to the display apparatus 100, the information stored in the second storage unit 250 is transmitted to the display apparatus 100. The information stored in the second storage unit 250 may be formed in the same type as the information stored in the first storage unit 150 and used to overwrite the information stored in the first storage unit 150.

Figure 5:
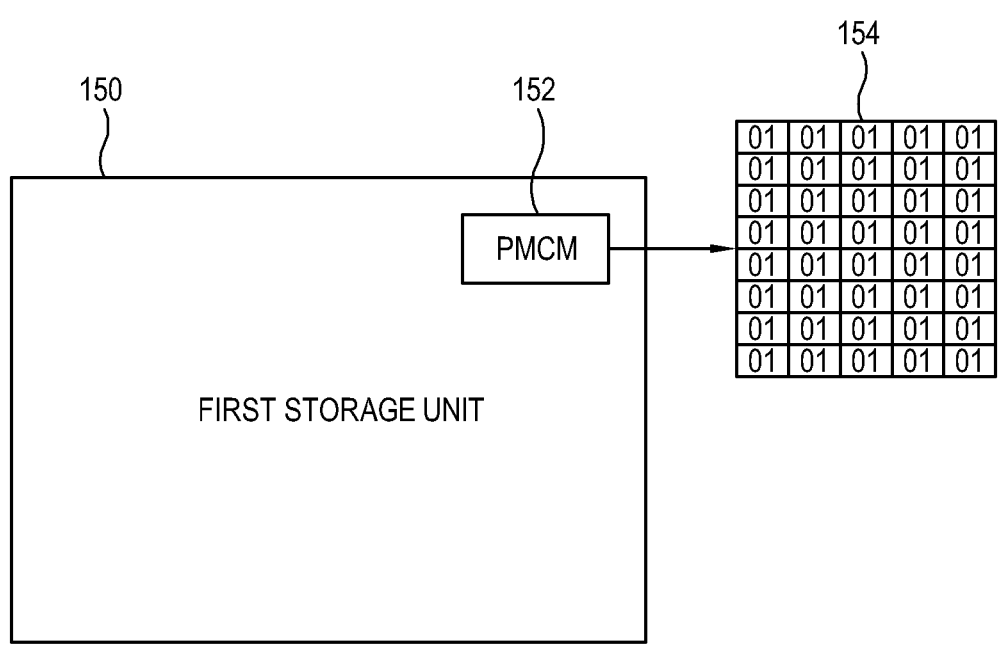
Figure 6:
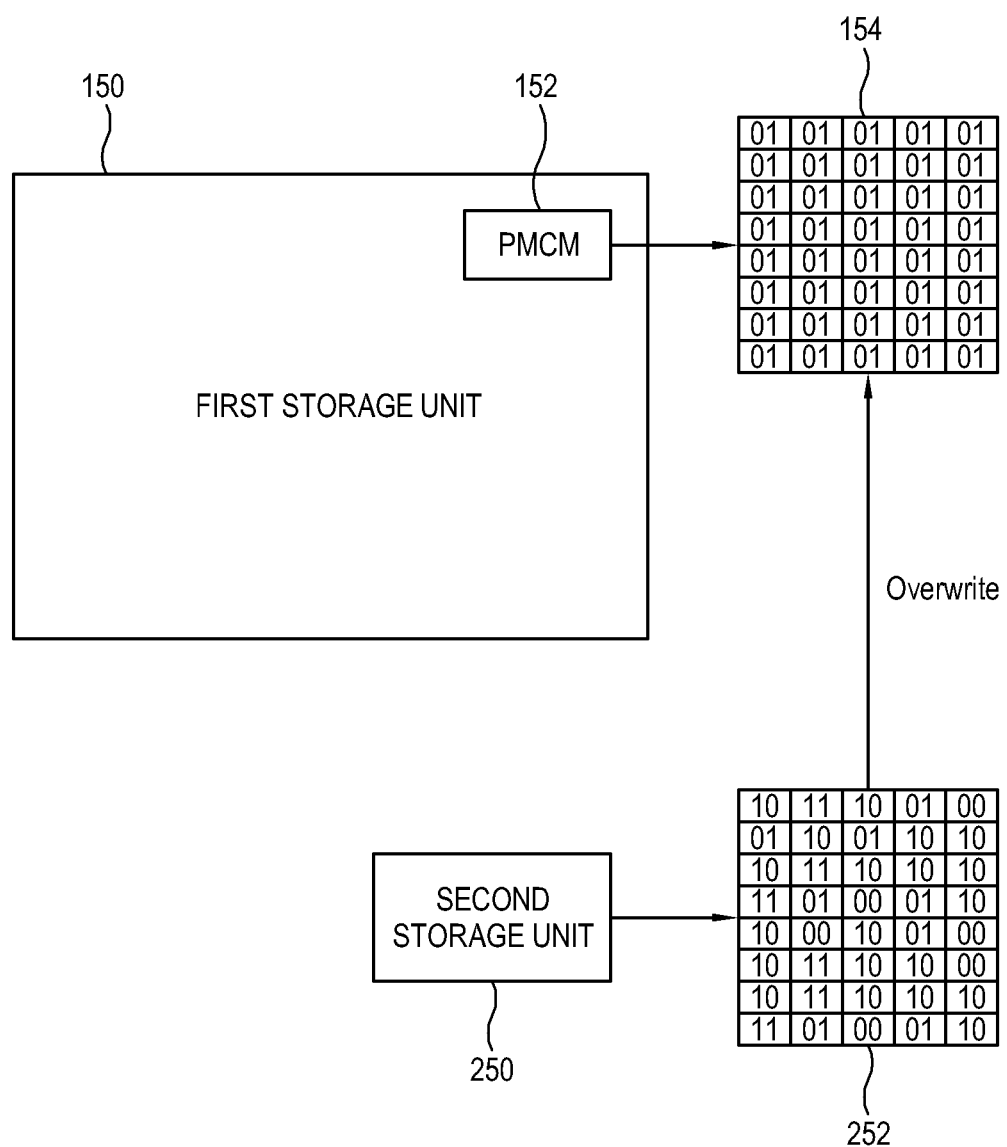

FIGS. 5, 6, and 7 illustrate an example of granting the control right according to the information stored in a memory.

As shown in FIG. 5, the first storage unit 150 is allotted a certain memory to support a port master control map (PMCM) 152. The PMCM 152 is used to determine which of the plurality of connected ports should be enabled or disabled. Hereinafter, an example is provided to illustrate that each of the first and second storage units 150 and 250 is allotted a total of 80 bits for the PMCM, illustrated as table 154, and each includes four types (00, 01, 10, 11), i.e., 2-bit information, to determine whether to enable or disable the display apparatus 100 and the upgrading apparatus 200 corresponding to 40 events.

As described above, the first storage unit 150 may include a RAM, and the control right is granted to the first central processor 130 or the second central processor 230 of the upgrading apparatus 200 based on the information stored in the first storage unit 150.

If the upgrading apparatus 200 is not mounted in the display apparatus 100, the first storage unit 150 loads a value stored in a non-volatile memory such as a flash memory. In this case, as shown in FIG. 5, the first storage unit 150 has 01 set as a default value for each of the 40 events. As in a table shown in FIG. 7, the first controller 140 enables the elements of the display apparatus 100, i.e., grants the control right to the first central processor 130 of the display apparatus 100 corresponding to all events so that the first central processor 130 controls the operations.

If the upgrading apparatus 200 is mounted in the display apparatus 100, new PMCM data which are stored in the second storage unit 250 are transmitted to the display apparatus 100, and the first controller 140 overwrites the PMCM data illustrated in FIG. 6 as table 252 and stored in the second storage unit 250 to the first storage unit 150. The second storage unit 250 is implemented as a non-volatile memory such as a flash memory, and stores therein information regarding the device which is granted the control right corresponding to the 40 events.

Upon occurrence of a predetermined event, the first controller 140 determines a target to which the control right is granted, based on the PMCM of the first storage unit 150. For example, if the PMCM is 01, which corresponds to the event of receiving an IR signal, the first controller 140 grants the control right to the first central processor 130 of the display apparatus 100 to operate according to the IR signal, and if the PMCM is 10, the first controller 140 grants the control right to the second central processor 230 of the upgrading apparatus 200 to operate according to the IR signal.

If the upgrading apparatus 200 is separated from the display apparatus 100 again, the first controller 140 deletes the PMCM data stored in the first storage unit 150 and loads the default value stored in the flash memory so that the first central processor 130 controls operations.

FIG. 7 illustrates a table which shows enabling or disabling of elements of the display apparatus 100 and the upgrading apparatus 200 with respect to each bit state.

Figure 8:
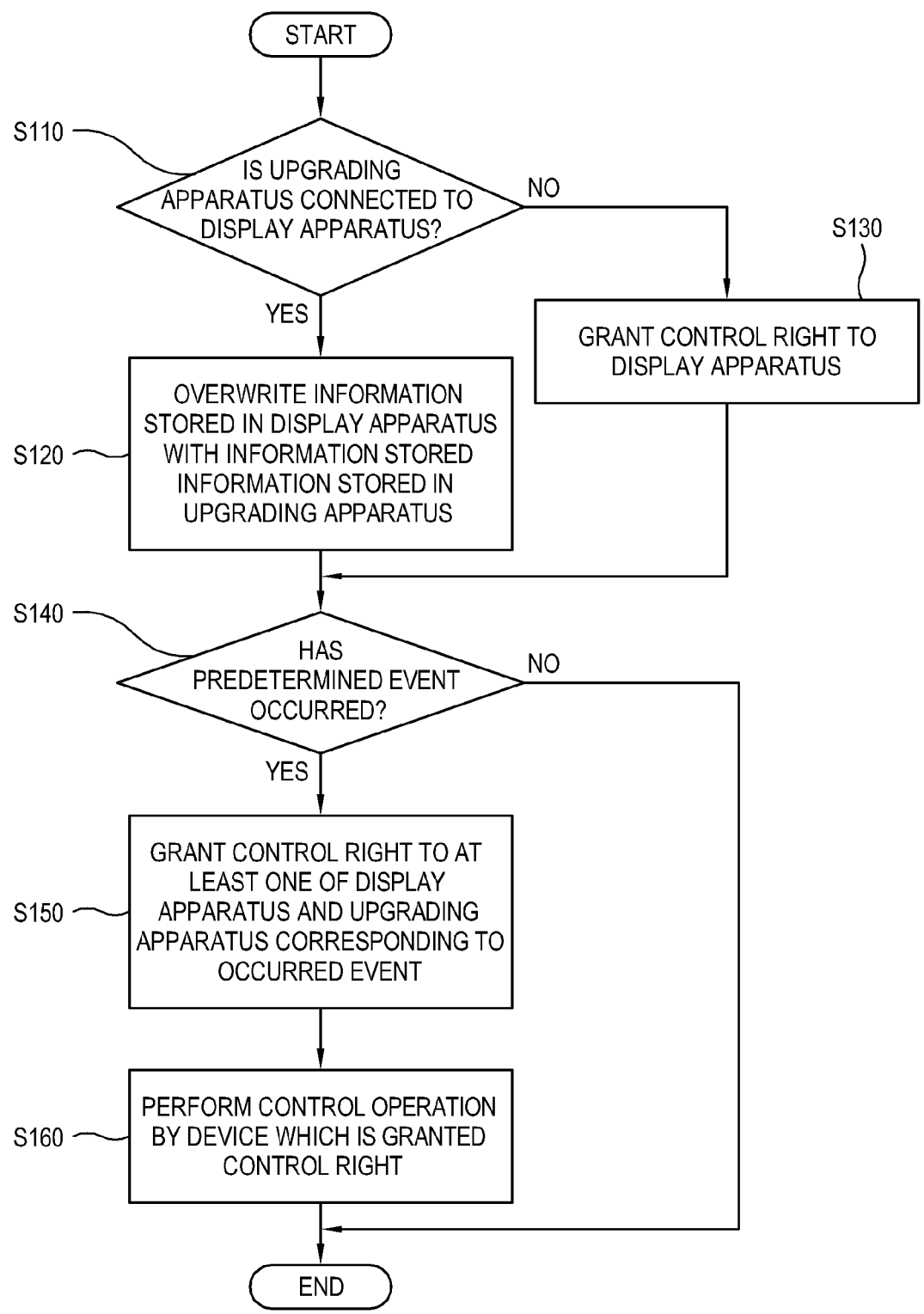
FIG. 8 is a control flowchart for a method which is executable by the display apparatus according to the second exemplary embodiment.

FIG. 8 is a control flowchart for a method which is executable by the display apparatus 100 according to the second exemplary embodiment.

In operation S110, the display apparatus 100 checks whether the upgrading apparatus 200 is connected thereto.

In operation S130, if the upgrading apparatus 200 is not connected to the display apparatus 100, the display apparatus 100 is granted the control right to all events based on its PMCM value. In operation S120, if the upgrading apparatus 200 is connected to the display apparatus 100, the information regarding the control right which is stored in the upgrading apparatus 200, i.e., the PMCM data, is used to overwrite the information stored in the display apparatus 100. A description of loading and overwriting the information regarding the control right stored in the display apparatus 100 and the upgrading apparatus 200 is the same as that the description which has been provided above with reference to FIGS. 5, 6, and 7.

In operation S140, the display apparatus 100 monitors whether a predetermined event occurs, and then in operation S150, the display apparatus 100 grants the control right to the display apparatus to perform a predetermined control operation corresponding to the first event if the occurrence of the first event of the plurality of events is detected, and grants the control right to the upgrading apparatus 200 so that the upgrading apparatus 200 performs a control operation, corresponding to the second event, if the occurrence of the second event is detected. In operation S160, the one of the display apparatus 100 or the upgrading apparatus 200 to which the control right has been granted may perform a control operation corresponding to the predetermined event in accordance with the preset process.

The display apparatus 100 may store information regarding the control right corresponding to the plurality of events, and grant the control right to the CPU of the display apparatus 100 or the CPU of the upgrading apparatus 200 based on the stored information.

The one of the CPU of the display apparatus 100 or the CPU of the upgrading apparatus 200 to which the control right has been granted performs a predetermined control operation corresponding to the event that has occurred.

According to the second exemplary embodiment, in the display system including the display apparatus 100 and the upgrading apparatus 200, a target which is granted the control right by the PMCM value upon occurrence of a predetermined event is clearly defined, and thus conflict between the CPUs of the display apparatus 100 and the upgrading apparatus 200 may be prevented, and a corresponding time delay in transmitting data may be reduced.

Hereinafter, a display apparatus 100 and a control method thereof according to a third exemplary embodiment will be described with reference to FIGS. 9 to 13.

Figure 9:
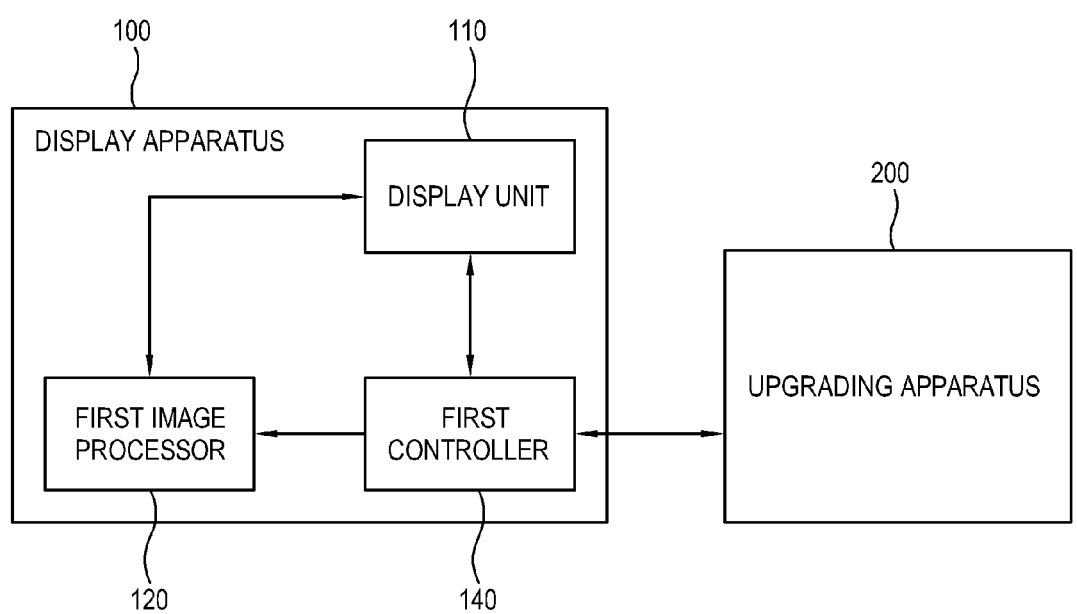
FIG. 9 is a control block diagram of a display apparatus according to a third exemplary embodiment.

FIG. 9 is a control block diagram of the display apparatus 100 according to the present exemplary embodiment.

As shown therein, the display apparatus 100 includes a display unit 110, a first image processor 120, and a first controller 140. As in other exemplary embodiments, the display apparatus 100 according to the present exemplary embodiment may be implemented as a TV, and the display apparatus 100 may be connected to the upgrading apparatus 200, which upgrades hardware or software of the display apparatus 100, to use functions of the upgrading apparatus 200.

The display unit 110 displays an image thereon. The display unit 110 may be implemented, for example, as a PDP, an LCD, an OLED, and/or a flexible display.

The image processor processes image signals supplied by an external image supply source (not shown) or image data stored therein based on a predetermined image processing operation to display an image on the display unit 110. The image processing operation of the image processor may include a de-multiplexing operation for dividing a predetermined signal into constituent signals by type, a decoding operation corresponding to an image format of an image signal, a de-interlacing operation for converting an interlaced image signal into a progressive image signal, a scaling operation for adjusting an image signal into a preset resolution, a noise reduction operation for improving an image quality, a detail enhancement operation, a frame refresh rate conversion operation, and/or any other relevant image processing function, but not limited thereto. The image processor may be implemented as at least one circuit board including various chipsets and memories to perform the image processing operations.

The first controller 140 may enable the upgrading apparatus 200 connected to the display apparatus 100 when the display apparatus 100 is initially driven, and supports control functions of the CPU of the display apparatus 100, including, for example, reception of an IR signal and performance of a wakeup operation. The first controller 140 may include a microcomputer.

A microprocessor such as a microcomputer and a CPU should be designed to receive a system reset signal to start its operation as set in advance, upon reception of power. In the display apparatus 100 according to the exemplary embodiment, not only the first controller 140 and the first central processor 130 of the display apparatus 100, but also the connected upgrading apparatus 200, should be reset at the time of the initial driving.

The upgrading apparatus 200 is provided to upgrade at least one of hardware or software functions of the display apparatus 100, and the elements of the upgrading apparatus 200 may be changed based on the development of technology and to meet a user's demand. The upgrading apparatus 200 may include a microcomputer in addition to a CPU to control the changed function, but if the upgrading apparatus 200 has simple elements, the microcomputer is not necessarily mounted in the upgrading apparatus 200.

The first controller 140 determines whether the upgrading apparatus 200 includes the microcomputer if the upgrading apparatus 200 is connected to the display apparatus 100, and if so, the first controller 140 grants the control right to the microcomputer of the upgrading apparatus 200 so that the microcomputer enables the upgrading apparatus 200. If the upgrading apparatus 200 does not include the microcomputer, the first controller 140 transmits the system reset signal to enable the upgrading apparatus 200.

If the microcomputer is mounted in the upgrading apparatus 200, the microcomputer includes a reset circuit and resets the CPU and other microprocessors of the upgrading apparatus 200 to more efficiently enable the upgrading apparatus 200.

Figure 10:
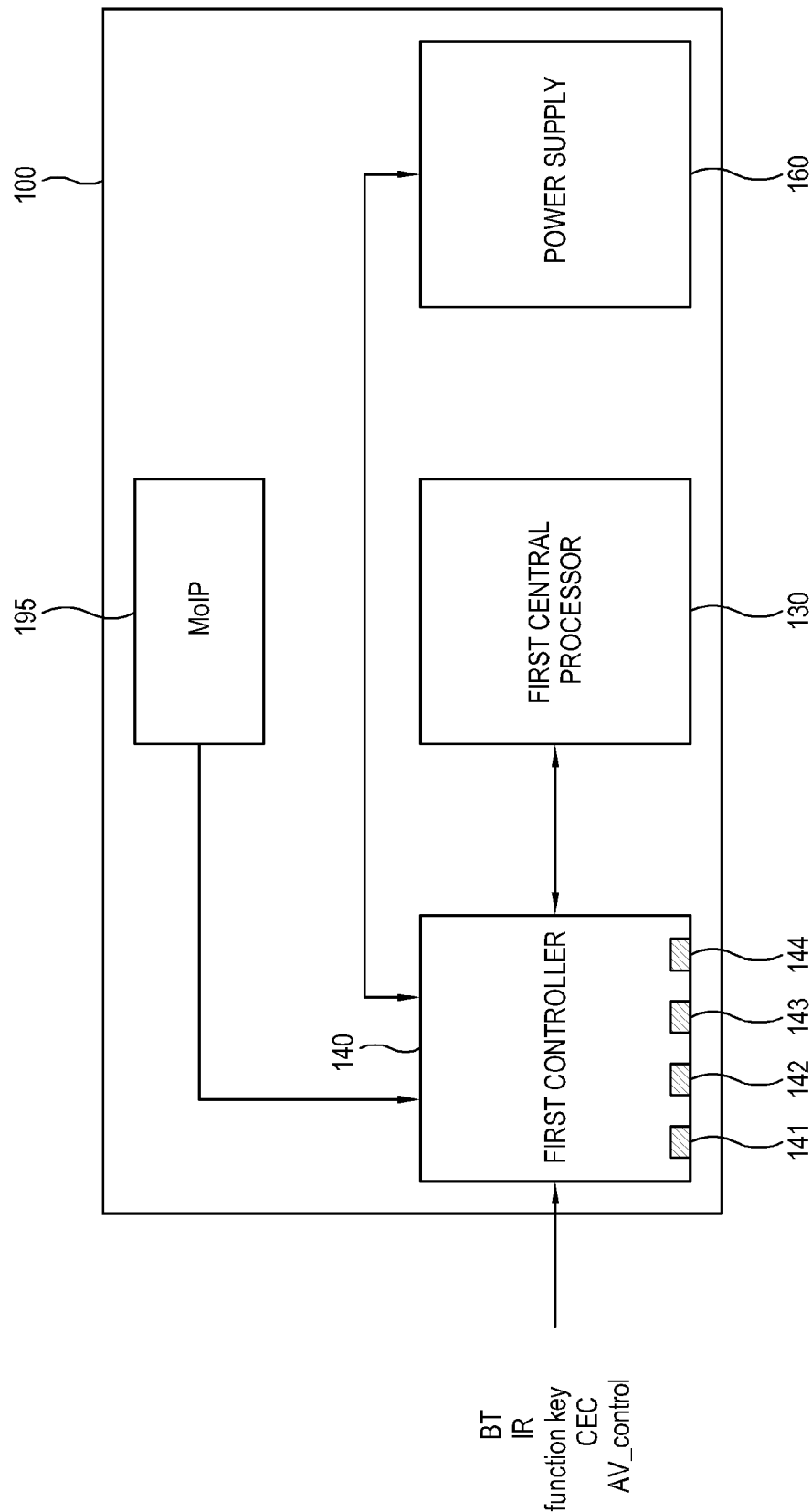
FIGS. 10, 11, and 12 illustrate detailed characteristics of a first controller according to the third exemplary embodiment.
Figure 11:
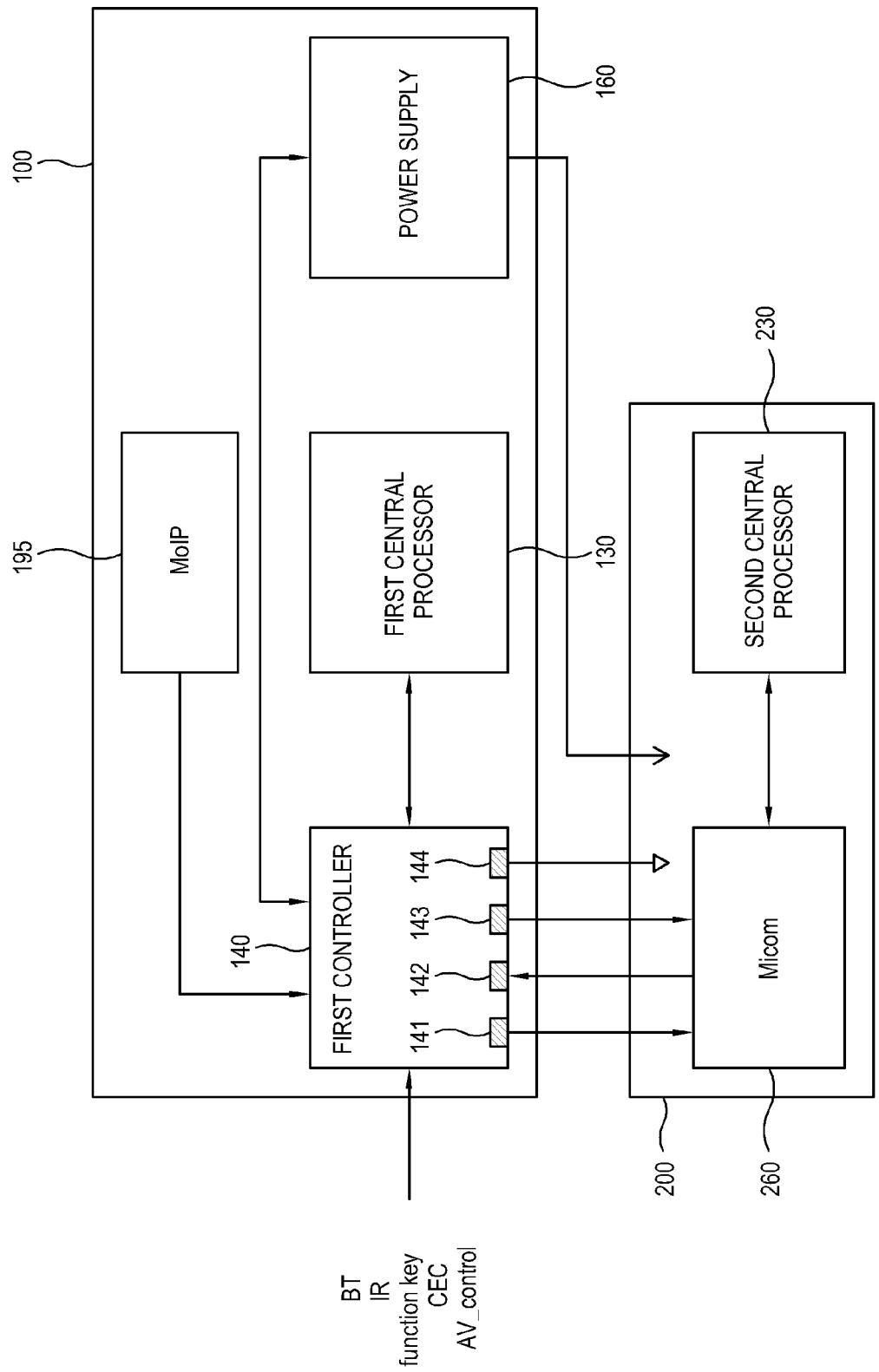
Figure 12:
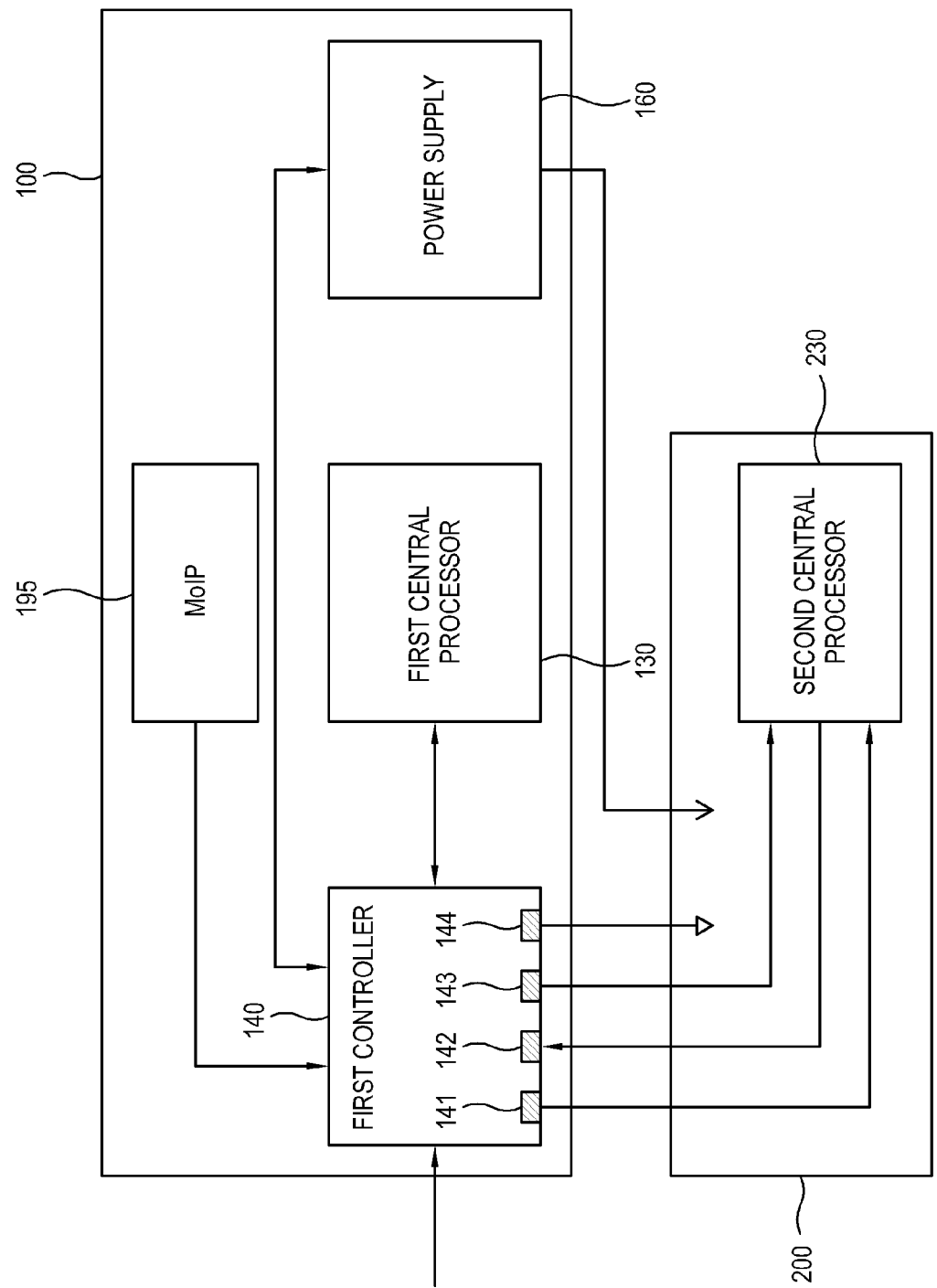

Hereinafter, FIGS. 10, 11, and 12 illustrate detailed characteristics of a first controller according to a third exemplary embodiment.

As shown in FIG. 10, the first controller 140 may receive a signal from the outside via at least one of Bluetooth, IR, function keys, high definition multimedia interface—consumer electronics control (HDMI-CEC), and AV_control, and if an MoIP module 195 is mounted in the display apparatus 100, the first controller 140 may control the MoIP module 195. The above characteristics are not essential elements of the first controller 140 according to the exemplary embodiment.

The first controller 140 may communicate with the first central processor 130 to exchange various control signals, and the first controller 140 may transmit a control signal to the power supply 160 for power supply. A communication line between the first controller 140 and the first central processor 130 may be implemented as a UART, and the power supply 160 may be implemented as a switch mode power supply (SMPS) in the public domain.

The first controller 140 may allot four pins 141, 142, 143, and 144 to communicate with the connected upgrading apparatus 200, and the four pins may include, for example, a UART transmission pin 141, a UART reception pin 142, a GPIO pin 143 and a connection detecting pin 144.

The connection detecting pin 144 detects a connection of the upgrading apparatus 200. The connection detecting pin 144 is connected to a ground terminal, and the first controller 140 may check a connection/non-connection status of the upgrading apparatus 200 based on a corresponding change of an electric potential as a result of the ground connection.

When power is initially applied, the first controller 140 may check the connection/non-connection status of the upgrading apparatus 200 and determine whether to solely operate the display apparatus 100 or to enable the upgrading apparatus 200 based on a result of the check. If the upgrading apparatus 200 is not connected to the display apparatus 100, the first controller 140 transmits a reset signal to the first central processor 130, and controls the power supply 160 to supply power to the elements of the display apparatus 100, and an additional operation is not needed to enable the upgrading apparatus 200. If a determination is made, as a result of the check, that the upgrading apparatus 200 is connected to the display apparatus 100, an operation is required to enable the upgrading apparatus 200, and this operation may be dependent upon whether the upgrading apparatus 200 includes the microcomputer.

Microcomputer detecting pins 141 and 142 check whether the connected upgrading apparatus 200 includes a microcomputer if the connection of the upgrading apparatus 200 is detected by the connection detecting pin 144. The microcomputer detecting pins 141 and 142 include a UART transmission pin 141 which transmits a predetermined call signal to the upgrading apparatus 200, and a UART reception pin 142 which receives a response signal which corresponds to the predetermined call signal from the microcomputer of the upgrading apparatus 200. If the connection of the upgrading apparatus 200 is detected, the first controller 140 transmits the call signal through the UART transmission pin 141, and the upgrading apparatus 200 transmits the response signal corresponding to the call signal so that whether the upgrading apparatus 200 includes the microcomputer may be checked based on the reception/non-reception of the response signal via the UART reception pin 142.

FIG. 11 illustrates an enabling of the upgrading apparatus 200, in an exemplary embodiment in which the upgrading apparatus 200 includes a microcomputer 260.

If the microcomputer detecting pins 141 and 142 detect that the upgrading apparatus 200 includes the microcomputer 260, the first controller 140 transmits a predetermined signal to the microcomputer 260 of the upgrading apparatus 200 to grant the control right via the GPIO pin 143, and the power supply 160 supplies power to the upgrading apparatus 200.

The microcomputer 260 of the upgrading apparatus 200 which is granted the control right includes a predetermined reset circuit, and transmits a reset signal to the second central processor 230 of the upgrading apparatus 200 and enables the upgrading apparatus 200 by using a separate process from the display apparatus 100.

FIG. 12 illustrates an enabling of the upgrading apparatus 200, in an exemplary embodiment in which the upgrading apparatus 200 does not include the microcomputer.

If the microcomputer detecting pins 141 and 142 detect that the upgrading apparatus 200 does not include the microcomputer, the controller transmits a system reset signal to the second central processor 230 of the upgrading apparatus 200 via the GPIO pin 143, unlike the case described above with respect to FIG. 11, and the power supply 160 supplies power to the upgrading apparatus 200.

In this case, the upgrading apparatus 200 does not include an additional reset circuit, and the second central processor 230 of the upgrading apparatus 200 is enabled by the first controller 140 of the display apparatus 100 by using the same process as a process used by the first central processor 130 of the display apparatus 100.

Figure 13:
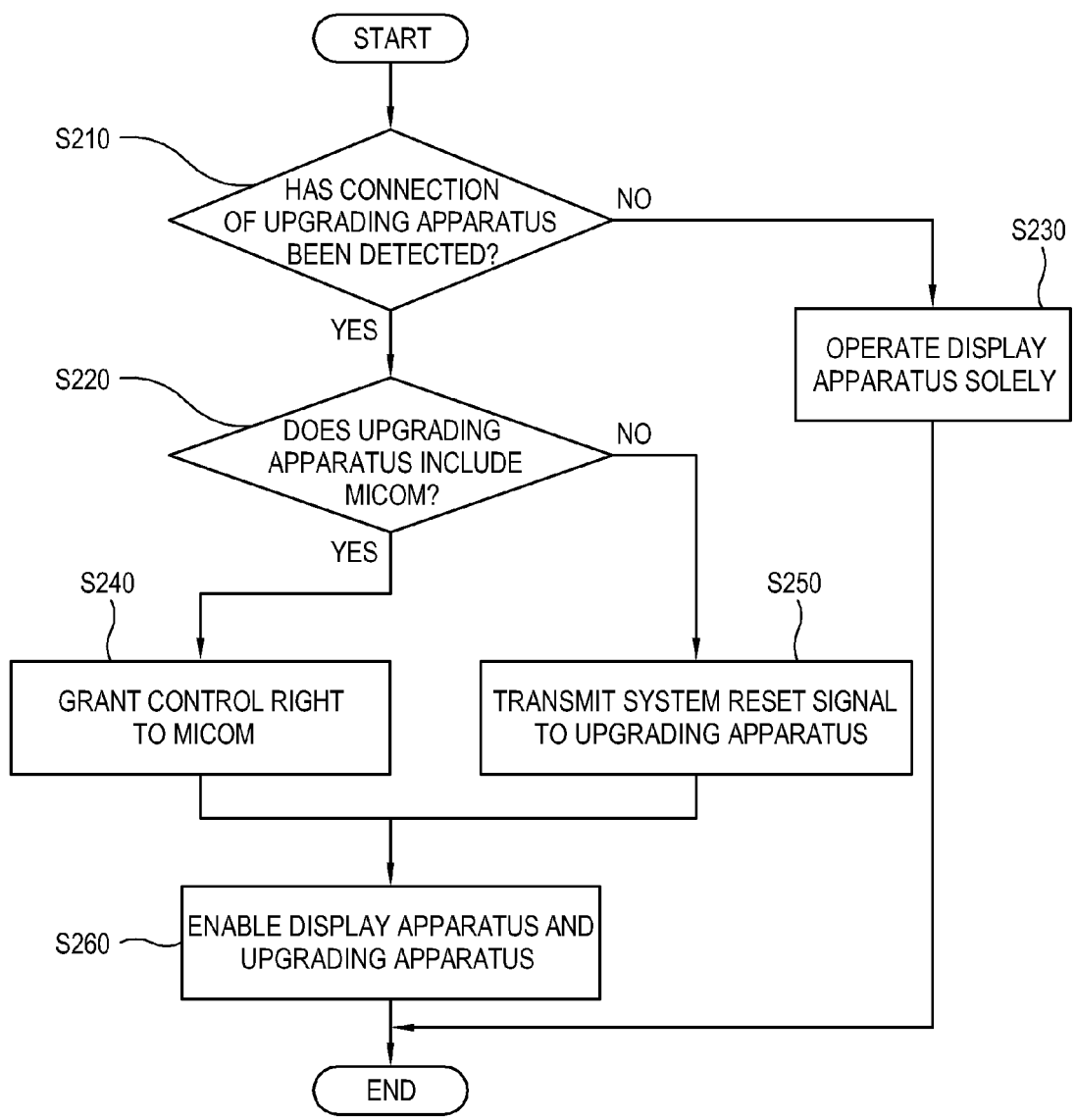
FIG. 13 is a control flowchart for a method which is executable by the display apparatus according to the third exemplary embodiment.

FIG. 13 is a control flowchart for a method which is executable by the display apparatus 100 according to the third exemplary embodiment.

In operation S210, the display apparatus 100 determines whether a connection of the upgrading apparatus 200 has been detected. The display apparatus 100 may detect the connection of the upgrading apparatus 200 via the connection detecting pin which is connected to a ground terminal. If the connection is not detected, in operation S230, the display apparatus 100 solely operates at the time of the initial driving. If the connection is detected, the display apparatus 100 performs processes to enable the upgrading apparatus 200.

If the connection of the upgrading apparatus 200 is detected, then in operation S220, the display apparatus 100 determines whether the upgrading apparatus 200 includes the microcomputer. This may be determined by whether the microcomputer of the upgrading apparatus 200 outputs a response signal corresponding to a predetermined call signal transmitted by the display apparatus 100 to the upgrading apparatus 200. The transmission of the call signal and reception of the response signal may be performed by using the UART transmission pin and the UART reception pin.

If the upgrading apparatus 200 includes the microcomputer, then in operation S240, the display apparatus 100 grants the control right to the microcomputer so that the microcomputer enables the upgrading apparatus 200. The microcomputer of the upgrading apparatus 200, to which the control right is granted, includes the reset circuit, and transmits the reset signal to the first central processor 130 of the upgrading apparatus 200 to enable the upgrading apparatus 200 by using a process which is independent from the display apparatus 100 in operation S260.

If the upgrading apparatus 200 does not include the microcomputer, then in operation S250, the display apparatus 100 transmits a predetermined system reset signal to the CPU of the upgrading apparatus 200 to enable the upgrading apparatus 200. In this case, the upgrading apparatus 200 does not include an additional reset circuit, and the second central processor 230 of the upgrading apparatus 200 is enabled by the display apparatus 100 by using the same process as of the process used by the CPU of the display apparatus 100 in operation S260.

As described above, according to the third exemplary embodiment, the upgrading apparatus 200 may be enabled stably and efficiently at the time of the initial driving regardless of whether the upgrading apparatus 200 includes the microcomputer.

As described above, a system in which an upgrading apparatus is mounted in a display apparatus to upgrade the display apparatus is provided.

A program for performing the methods according to the above-described various exemplary embodiments may be stored and used on various types of recording media.

In detail, a code for performing the above-described methods may be stored on various types of terminal-readable recording media such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, a CD-ROM, an/or any other suitable non-transitory or transitory medium.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display apparatus comprising:
   a display unit which displays an image thereon;
   a first image processor which processes an image signal;
   a first central processor which controls the display unit and the first image processor; and
   a first controller which selectively grants a control right to one of the first central processor and an upgrading apparatus, which processes the image signal and upgrades the display apparatus, to control the display apparatus,
   wherein the first controller grants the control right to the upgrading apparatus to perform a predetermined control operation corresponding to a predetermined event by using a second central processor when the upgrading apparatus is connected to the display apparatus via a connector which is provided in the display apparatus, and wherein, when the upgrading apparatus is connected to the display apparatus via the connector, the display apparatus outputs the image signal, via the connector, to the upgrading apparatus having the control right as a subject operates, receives the image signal processed by a second image processor of the upgrading apparatus, the second image processor comprising a decoder and the received image signal being decoded by the decoder, and displays an image on the display unit based on the image signal processed by the second image processor, wherein the second image processor is controlled by the second central processor.

2. The display apparatus according to claim 1, wherein the display apparatus further comprises a main body module which comprises the display unit and the first controller, and a main board module which comprises the first image processor and the first central processor, wherein the upgrading apparatus is usable as a replacement for the main board module.

3. The display apparatus according to claim 2, wherein the first controller determines whether the main board module is replaced by the upgrading apparatus, and checks whether the replaced upgrading apparatus is compatible with the main body module.

4. The display apparatus according to claim 3, wherein the main body module further comprises a storage unit which stores setting information relating to the main board module, and the first controller controls the upgrading apparatus to operate based on the setting information stored in the storage unit when the main board module is replaced by the upgrading apparatus.

5. The display apparatus according to claim 3, further comprising a power supply which supplies power, wherein
the first controller controls the power supply to cut off a supply of power if the main board module is disconnected from the display apparatus.

6. The display apparatus according to claim 1, wherein the first controller grants a control right to the first central processor to perform a control operation corresponding to a first event of a plurality of events, and grants the control right to the upgrading apparatus to perform a control operation corresponding to a second event of the plurality of events.

7. The display apparatus according to claim 6, wherein a first storage unit of the display apparatus stores information regarding the control right corresponding to the plurality of events, and when a predetermined one of the plurality of events occurs, the first controller grants the control right corresponding to the predetermined event to one of the first central processor and the upgrading apparatus, based on the information regarding the control right stored in the first storage unit.

8. The display apparatus according to claim 7, wherein the upgrading apparatus stores information regarding the control right corresponding to the plurality of events, and
when the upgrading apparatus is connected to the display apparatus, the first controller receives the information regarding the control right which is stored in the upgrading apparatus and uses the received information to overwrite the information stored in the first storage unit.

9. The display apparatus according to claim 6, wherein at least one event of the plurality of events occurs when a predetermined signal is received from an outside.

10. The display apparatus according to claim 1, wherein the first controller checks whether the upgrading apparatus includes a microcomputer when the upgrading apparatus is connected to the display apparatus, grants the control right to the microcomputer of the upgrading apparatus to enable the upgrading apparatus if the upgrading apparatus includes the microcomputer, and transmits a system reset signal to enable the upgrading apparatus if the upgrading apparatus does not include the microcomputer.

11. The display apparatus according to claim 10, wherein the first controller comprises a connection detecting pin which is connected to a ground terminal and which detects a connection of the upgrading apparatus.

12. The display apparatus according to claim 11, wherein the first controller checks a connection status of the upgrading apparatus by using the connection detecting pin when power is applied, and determines whether to activate the display apparatus solely or to enable the upgrading apparatus, based on a result of the check.

13. The display apparatus according to claim 10, wherein the first controller comprises a microcomputer detecting pin which is used to check whether the upgrading apparatus includes the microcomputer.

14. The display apparatus according to claim 13, wherein the microcomputer detecting pin comprises a universal asynchronous receiver transmitter (UART) transmission pin which transmits a predetermined call signal to the upgrading apparatus and a UART reception pin which is configured to receive a response signal which corresponds to the predetermined call signal from the microcomputer included in the upgrading apparatus, and the first controller checks whether the UART reception pin receives the response signal and uses a result of the check to determine whether the upgrading apparatus includes the microcomputer.

15. The display apparatus according to claim 14, wherein the controller comprises a general purpose input output (GPIO) pin, and wherein the controller transmits, to the upgrading apparatus, a signal for granting the control right and the system reset signal by using the GPIO pin.

16. A control method which is executable by a display apparatus, comprising:

connecting to an upgrading apparatus which processes an image signal and upgrades the display apparatus;

granting a control right to one of a first central processor of the display apparatus and the upgrading apparatus to enable control of the display apparatus; and performing a predetermined control operation corresponding to a predetermined event by using the one of the first central processor and the upgrading apparatus to which the control right is granted, wherein the granting the control right comprises granting the control right to the upgrading apparatus to perform the predetermined control operation corresponding to the predetermined event by using a second central processor when the upgrading apparatus is connected to the display apparatus, and wherein the performing the predetermined control operation comprises outputting the image signal from the display apparatus to the upgrading apparatus having the control right as a subject operates, receiving the image signal processed by a second image processor of the upgrading apparatus by the display apparatus, the second image processor comprising a decoder and the received image signal being decoded by the decoder, and displaying an image on a display unit provided in the display apparatus based on the image signal processed by the second image processor.

17. The control method according to claim 16, wherein the display apparatus comprises a main body module which comprises a display unit and a main board module which comprises the first central processor, and wherein the upgrading apparatus is usable as a replacement for the main board module.

18. The control method according to claim 16, wherein the granting the control right comprises one of granting the control right to the first central processor to perform a control operation corresponding to a first event of a plurality of events, and granting the control right to the upgrading apparatus to enable the upgrading apparatus to perform a control operation corresponding to a second event of the plurality of events.

19. The control method according to claim 18, wherein the display apparatus stores information regarding the control right corresponding to the plurality of events, and when a predetermined one of the plurality of events occurs, the granting the control right comprises granting the control right corresponding to the predetermined event to one of the first central processor and the upgrading apparatus, based on the stored information regarding the control right.

20. The control method according to claim 19, wherein the upgrading apparatus stores information regarding the control right corresponding to the plurality of events, and the method further comprises:

receiving information regarding the control right stored in the upgrading apparatus when the upgrading apparatus is connected to the display apparatus and using the received information to overwrite the information stored in the display apparatus.

21. The control method according to claim 18, wherein at least one event of the plurality of events occurs when a predetermined signal is received from an outside.

22. The control method according to claim 16, further comprising determining whether the upgrading apparatus includes a microcomputer when the upgrading apparatus is connected to the display apparatus;

granting a control right to the microcomputer to enable the upgrading apparatus if the upgrading apparatus includes the microcomputer; and transmitting a system reset signal to enable the upgrading apparatus if the upgrading apparatus does not include the microcomputer.

23. The control method according to claim 22, wherein the display apparatus detects a connection of the upgrading apparatus by using a connection detecting pin connected to a ground terminal.

24. The control method according to claim 22, wherein the determining whether the upgrading apparatus includes the microcomputer comprises transmitting a predetermined call signal to the upgrading apparatus; and receiving a response signal which corresponds to the predetermined call signal from the microcomputer included in the upgrading apparatus.

25. The control method according to claim 24, wherein the transmitting the predetermined call signal comprises transmitting the predetermined call signal by using a universal asynchronous receiver transmitter (UART) pin, and the receiving the response signal comprises receiving the response signal by using the UART pin.

* * * * *